US012482910B2

(12) United States Patent
Zhao et al.

(10) Patent No.: US 12,482,910 B2
(45) Date of Patent: Nov. 25, 2025

(54) PHASE SHIFTER AND METHOD FOR PREPARING PHASE SHIFTER

(71) Applicant: BOE TECHNOLOGY GROUP CO., LTD., Beijing (CN)

(72) Inventors: Jianyun Zhao, Beijing (CN); Jingwen Guo, Beijing (CN); Chunxin Li, Beijing (CN); Qianhong Wu, Beijing (CN); Jianxing Liu, Beijing (CN); Zibo Cao, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/261,517

(22) PCT Filed: Jul. 28, 2022

(86) PCT No.: PCT/CN2022/108607
§ 371 (c)(1),
(2) Date: Jul. 14, 2023

(87) PCT Pub. No.: WO2024/020936
PCT Pub. Date: Feb. 1, 2024

(65) Prior Publication Data
US 2024/0387967 A1 Nov. 21, 2024

(51) Int. Cl.
*H01P 1/18* (2006.01)
*H01P 1/12* (2006.01)
*H01P 11/00* (2006.01)

(52) U.S. Cl.
CPC ................ *H01P 1/18* (2013.01); *H01P 1/127* (2013.01); *H01P 11/00* (2013.01)

(58) Field of Classification Search
CPC .. H01P 1/184; H01P 1/18; H01P 1/182; H01P 1/10; H01P 1/127; H01P 11/00;
(Continued)

(56) References Cited

U.S. PATENT DOCUMENTS

| | | | | |
|---|---|---|---|---|
| 6,204,737 B1 * | 3/2001 | Ella | H03H 9/60 333/133 |
| 8,315,030 B2 * | 11/2012 | Yamazaki | H01G 5/16 361/290 |

(Continued)

FOREIGN PATENT DOCUMENTS

| | | |
|---|---|---|
| CN | 101777461 A | 7/2010 |
| CN | 109635423 A | 4/2019 |

(Continued)

OTHER PUBLICATIONS

Lee et al. "A surface-micromachined MEMS acoustic sensor with X-shape bottom electrode anchor"; Advanced i-MEMS team, CCMRL; Oct. 1, 2009; 4 Pages.

(Continued)

*Primary Examiner* — Lincoln D Donovan
*Assistant Examiner* — Tyler J Pereny
(74) *Attorney, Agent, or Firm* — Raj S. Dave; Dave Law Group LLC

(57) ABSTRACT

A phase shifter and a method for preparing a phase shifter are provided. The phase shifter includes at least one phase shifter unit. The phase shifter unit includes a substrate; a first lead and a second lead on the substrate and spaced apart from each other; a bridging section on the first lead and the second lead, wherein the bridging section is connected to the first lead and the second lead; and a third lead on a side of the bridging section away from the substrate.

14 Claims, 12 Drawing Sheets

(58) Field of Classification Search
CPC ...... H01P 1/181; H01P 1/2088; H01P 11/001; H01P 3/02; H01P 3/081; H01Q 3/36; H01Q 3/44; H01Q 3/34; H01Q 9/0457; H01Q 1/38; H01Q 1/48; H01Q 21/061; H01Q 3/38; H01Q 7/00; B81B 7/02; B81B 2203/0109
See application file for complete search history.

(56) References Cited

U.S. PATENT DOCUMENTS

| | | | | |
|---|---|---|---|---|
| 2008/0272857 | A1 | 11/2008 | Singh | |
| 2020/0274217 | A1 | 8/2020 | Min et al. | |
| 2022/0131247 | A1 | 4/2022 | Li et al. | |
| 2022/0140458 | A1* | 5/2022 | Guo | H01Q 3/36 343/850 |
| 2022/0238974 | A1 | 7/2022 | Li et al. | |
| 2022/0311112 | A1 | 9/2022 | Wang et al. | |

FOREIGN PATENT DOCUMENTS

| | | | |
|---|---|---|---|
| CN | 109950063 | A | 6/2019 |
| CN | 111316497 | A | 6/2020 |
| CN | 112787052 | A | 5/2021 |
| CN | 113321177 | A | 8/2021 |
| CN | 215497017 | U | 1/2022 |
| CN | 114300821 | A | 4/2022 |
| CN | 114447543 | A | 5/2022 |
| CN | 114497929 | A | 5/2022 |
| KR | 20060070295 | A | 6/2006 |

OTHER PUBLICATIONS

Hu Jing-jie; "A Study On Reliability Of Silicon Nitride For Space Applications In Mems Devices"; School of Electronic Science and Engineering Southeast University; May 2018; 14 Pages.

* cited by examiner

PHASE SHIFTER AND METHOD FOR PREPARING PHASE SHIFTER

CROSS REFERENCE TO RELATED APPLICATIONS

This patent application is a National Stage Entry of PCT/CN2022/108607 filed on Jul. 28, 2022, the disclosure of which is incorporated by reference herein in its entirety as part of the present application.

TECHNICAL FIELD

The present disclosure text relates to a field of electronics technology. More specifically, it relates to a phase shifter and a method for preparing a phase shifter.

BACKGROUND

A phase shifter is a device that can adjust the phase of a wave. With the development of RF micromechanics, MEMS phase shifters have attracted more and more attention. Compared with conventional phase shifters, MEMS phase shifters are mainly prepared using semiconductor materials as substrates and by microfabrication techniques. They have the advantages of wider bandwidth, low loss, low cost, ultra-miniaturization, and easy integration with ICs or MMIC circuits, etc.

SUMMARY

Embodiments of the presently disclosure provide a phase shifter. The phase shifter includes at least one phase shifter unit. The phase shifter unit includes a substrate, a first lead and a second lead on the substrate and spaced apart from each other, a bridging section on the first lead and the second lead, wherein the bridging section is connected to the first lead and the second lead, and a third lead on a side of the bridging section away from the substrate.

In some embodiments, the phase shifter unit further includes an isolation layer which covers at least a surface of the third lead facing towards the substrate.

In some embodiments, the isolation layer further covers a surface of the third lead away from the substrate and a side surface of the third lead between a surface of the third lead away from the substrate and a surface of the third lead facing toward the substrate.

In some embodiments, the bridging section includes a bridge structure disposed opposite to the substrate, a first anchoring section connecting the bridge structure to the first lead and a second anchoring section connecting the bridge structure to the second lead, wherein the bridge structure includes a middle portion, a first portion extending from the middle portion toward the first anchoring section and a second portion extending from the middle portion toward the second anchoring section, and wherein a projection of the middle portion on the substrate overlaps with a projection of the third lead on the substrate.

In some embodiments, the width of the middle portion satisfies at least one of the following: the width of the middle portion is greater than the width of the first portion, and the width of the middle portion is greater than the width of the second portion.

In some embodiments, the phase shifter unit further includes a support on a surface of the substrate provided with the first lead and the second lead, and wherein a projection of the support on the substrate overlaps with a projection of the bridge structure on the substrate.

In some embodiments, the projection of the support on the substrate falls within a projection of the middle portion of the bridging section on the substrate.

In some embodiments, the support includes at least two sub-supports, and wherein the at least two sub-supports are on different sides of the middle portion of the bridging section in an extension direction of the bridging section.

In some embodiments, the support includes four sub-supports, and wherein the four sub-supports correspond to four corners of the middle portion of the bridging section one by one.

In some embodiments, the middle portion of the bridging section has a through-hole. The isolation layer may further include a first extension extending, from a surface of the third lead facing toward the substrate, toward the substrate, wherein the first extension has a first subpart passing through the through-hole and a second subpart opposite the substrate surface, wherein the second subpart is connected to an end of the first subpart facing toward the substrate, and wherein a size of a projection of the second subpart on the substrate is larger than a size of a projection of the through-hole on the substrate.

In some embodiments, an extension direction of the second subpart is perpendicular to an extension direction of the first subpart.

In some embodiments, a distance of the second subpart to the substrate is less than or equal to a distance of the bridging section to the substrate.

In some embodiments, the bridge structure has a first surface away from the substrate and a second surface facing toward the substrate, and wherein an area of the through-hole at the first surface is less than an area of the through-hole at the second surface.

In some embodiments, the isolation layer includes a second extension, wherein a third subpart of the second extension extending, from a side surface of the third lead, towards the substrate, and wherein a fourth subpart of the second extension extending, from an end of the third subpart near the substrate, towards the middle portion of the bridging section. The bridging section further includes a third extension, wherein a fifth subpart of the third extension extending, from a side of the middle portion of the bridging section away from the substrate, toward the third lead, wherein a sixth subpart of the third extension extending, from a side of the fifth subpart facing toward the third lead, toward the third subpart, and wherein a projection of the fourth subpart on the substrate overlaps with a projection of the sixth subpart on the substrate.

In some embodiments, the bridging section includes a fourth extension, wherein a seventh subpart of the fourth extension extends from a surface of the bridging section away from the substrate and in a direction away from the substrate, wherein an eighth subpart of the fourth extension extends from an end of the seventh subpart away from the substrate and towards the third lead. The isolation layer includes a fifth extension, wherein the fifth extension extends, from a side of the third lead facing toward the substrate, toward the seventh subpart, wherein a projection of the fifth extension on the substrate overlaps with a projection of the eighth subpart on the substrate.

In some embodiments, the third lead includes a first sub-lead, a second sub-lead disposed on both sides of the first sub-lead, a sidewall connecting the first sub-lead to the second sub-lead, the first sub-lead being on a side of the bridging section away from the substrate, the second sub-lead being in the same plane as the first lead.

In some embodiments, the third lead is integrally on a side of the bridging section away from the substrate.

In some embodiments, the isolation layer includes a silicon nitride compound. At least one of the first lead, the second lead and the third lead includes at least one of: a molybdenum-nickel-titanium alloy, copper and combinations thereof. The bridging section includes at least one of: molybdenum, aluminum and combinations thereof.

Embodiments of the present invention also provide a method for preparing a phase shifter including forming at least one phase shifter unit, wherein forming the at least one phase shifter unit includes forming a first lead and a second lead spaced apart from each other on a substrate, forming a bridging section on the first lead and the second lead, wherein the bridging section connects the first lead and the second lead, and forming a third lead on a side of the bridging section away from the substrate.

In some embodiments, the method further includes forming an isolation layer covering at least a surface of the third lead facing towards the substrate.

In some embodiments, forming the first lead, the second lead, the bridging section, the third lead, and the isolation layer includes forming a first conductive material layer on the substrate, patterning the first conductive material layer to form the first lead and the second lead, forming a first sacrificial layer between the first lead and the second lead, forming the bridging section on the first sacrificial layer, forming a second sacrificial layer on the bridging section, forming the isolation layer on the second sacrificial layer, forming a third lead layer on the isolation layer, and removing the first sacrificial layer and the second sacrificial layer.

In some embodiments, the bridging section includes a bridge structure disposed opposite to the substrate, a first anchoring section connecting the bridge structure to the first lead and a second anchoring section connecting the bridge structure to the second lead, the bridge structure including a middle portion, a first portion extending from the middle portion to the first anchoring section, and a second portion extending from the middle portion to the second anchoring section, wherein a projection of the middle portion on the substrate overlaps with a projection of the third lead on the substrate, wherein the middle portion having a width satisfying at least one of the following: the width of the middle portion is greater than a width of the first portion, and the width of the middle portion is greater than a width of the second portion.

In some embodiments, the method further includes forming, before forming the first sacrificial layer, a support between the first lead and the second lead, wherein a projection of the support on the substrate falls within a projection of the middle portion of the bridging section on the substrate.

In some embodiments, the middle portion of the bridging section has a through-hole, the isolation layer further includes a first extension extending, from a surface of the third lead facing toward the substrate, toward the substrate, the first extension having a first subpart passing through the through-hole and a second subpart opposite the substrate surface, the second subpart being connected to an end of the first subpart facing toward the substrate, and wherein a size of a projection of the second subpart on the substrate is larger than a size of a projection of the through-hole on the substrate. Forming the first lead, the second lead, the bridging section, the third lead, and the isolation layer may include: forming a first conductive material layer on the substrate; patterning the first conductive material layer to form the first lead and the second lead; forming a first sub-sacrificial layer between the first lead and the second lead; forming the second subpart on the first sub-sacrificial layer; forming a second sub-sacrificial layer on the second subpart to form the first sacrificial layer; forming the bridging section having the through-hole on the first sacrificial layer; forming a second sacrificial layer on the bridging section; forming the isolation layer having the first subpart on the second sacrificial layer; forming a third lead layer on the isolation layer; and removing the first sacrificial layer and the second sacrificial layer In some embodiments, the isolation layer has a second extension, wherein a third subpart of the second extension extending, from a side surface of the third lead, towards the substrate, and wherein a fourth subpart of the second extension extending, from an end of the third subpart near the substrate, towards the middle portion of the bridging section. The bridging section may further include a third extension, wherein a fifth subpart of the third extension extending, from a side of the middle portion of the bridging section away from the substrate, toward the third lead, wherein a sixth subpart of the third extension extending, from a side of the fifth subpart facing toward the third lead, toward the third subpart, wherein a projection of the fourth subpart on the substrate overlaps with a projection of the sixth subpart on the substrate. Forming the first lead, the second lead, the bridging section, the third lead, and the isolation layer may include forming a first conductive material layer on the substrate; patterning the first conductive material layer to form the first lead and the second lead; forming a first sacrificial layer between the first lead and the second lead; forming, on the first sacrificial layer, a bridge structure of the bridging section disposed opposite the substrate, a first anchoring section connecting the bridge structure to the first lead, and a second anchoring section connecting the bridge structure to the second lead; forming the fourth subpart on the bridge structure; forming the third extension of the bridging section; forming the isolation layer; forming the third lead layer on the isolation layer; and removing the first sacrificial layer.

In some embodiments, the bridging section has a fourth extension, wherein a seventh subpart of the fourth extension extends, from a surface of the bridging section away from the substrate, in a direction away from the substrate, wherein an eighth subpart of the fourth extension extends from an end of the seventh subpart away from the substrate towards the third lead. The isolation layer may include a fifth extension, wherein the fifth extension extends, from a side of the third lead facing toward the substrate, toward the seventh subpart, wherein a projection of the fifth extension on the substrate overlaps with a projection of the eighth subpart on the substrate. Forming the first lead, the second lead, the bridging section, the third lead, and the isolation layer may include: forming a first conductive material layer on the substrate; patterning the first conductive material layer to form the first lead and the second lead; forming a first sacrificial layer between the first lead and the second lead; forming, on the first sacrificial layer, a bridge structure of the bridging section disposed opposite the substrate, a first anchoring section connecting the bridge structure to the first lead and a second anchoring section connecting the bridge structure to the second lead; forming the fifth extension on the bridge structure; forming the seventh subpart and the eighth subpart of the bridging section; forming the isolation layer; forming a third lead layer on the isolation layer; and removing the first sacrificial layer.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein.

DETAILED DESCRIPTION

Figure 1A:
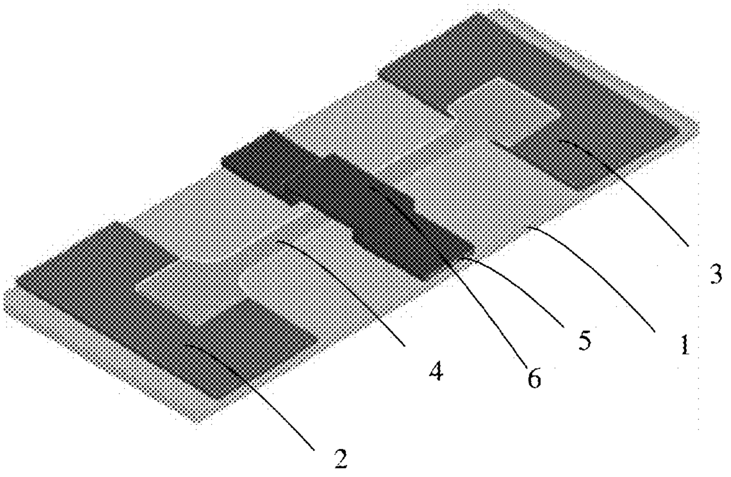
FIG. 1A shows a schematic view of a phase shifter according to an embodiment of the present invention.

In order to make the objectives, technical solutions and advantages of the embodiments of the present disclosure more comprehensible, the technical solutions of the embodiments of the present disclosure are clearly and completely described below with reference to the accompanying drawings. Obviously, the described embodiments are only a part but not all of the embodiments of the present disclosure. Based on the described embodiments of the present disclosure, all other embodiments obtained by those skilled in the art without creative efforts shall also fall within the protection scope of the present disclosure.

As used herein and in the appended claims, the singular form of a word includes the plural, and vice versa, unless the context clearly dictates otherwise. Thus, the references “a”, “an”, and “the” are generally inclusive of the plurals of the respective terms. Similarly, the words “comprise”, “comprises”, and “comprising” are to be interpreted inclusively rather than exclusively.

For purposes of the description, hereinafter, the terms “upper”, “lower”, “right”, “left”, “vertical”, “horizontal”, “top”, “bottom”, and derivatives thereof shall relate to the disclosure, as it is oriented in the drawing figures. The terms “overlying”, “atop”, “positioned on” or “positioned atop” means that a first element, such as a first structure, is present on a second element, such as a second structure, wherein intervening elements, such as an interface structure, e.g., interface layer, may be present between the first element and the second element. The term “contact” means that a first element, such as a first structure, and a second element, such as a second structure, are connected with or without any intermediary elements at the interface of the two elements.

Figure 1B:
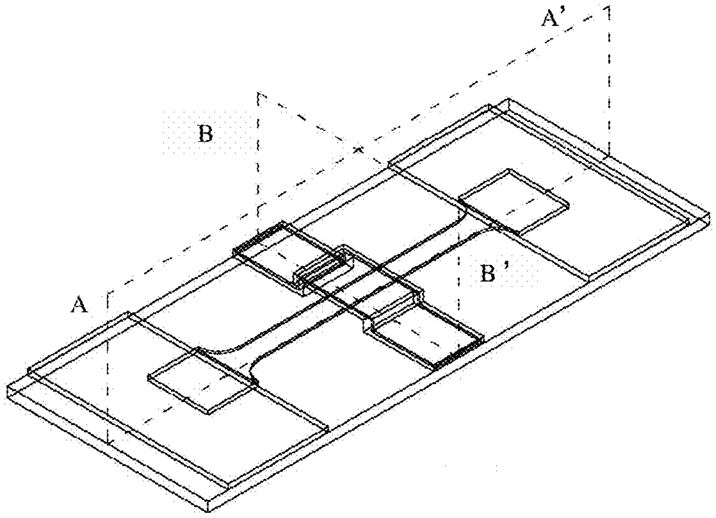
FIG. 1B shows a perspective schematic view of a phase shifter according to an embodiment of the present invention.
Figure 2:
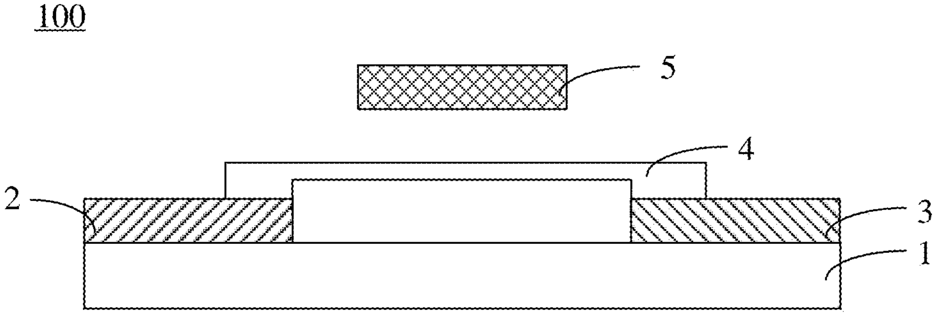
FIG. 2 is a schematic cross-sectional view of the phase shifter according to an embodiment of the present invention along section AA' of FIG. 1B.

FIG. 1A shows a schematic view of a phase shifter according to an embodiment of the present invention, and FIG. 1B shows a perspective schematic view of the phase shifter of an embodiment of the present invention. FIG. 2 shows a schematic cross-sectional view of the phase shifter according to an embodiment of the present invention along the cross-section AA' of FIG. 1B. As shown, the phase shifter according to an embodiment of the present invention may include at least one phase shifter unit 100. The phase shifter unit may include a substrate 1, a first lead 2 and a second lead 3 on the substrate and spaced apart from each other, a bridging section 4 on the first lead 2 and the second lead 3, and a third lead 5 on a side of the bridging section 4 away from the substrate 1. As shown in FIG. 1, the bridging section 4 is connected to the first lead 2 and the second lead 3, and the bridging section 4 is spaced apart from the substrate.

In some embodiments, the first lead and the second lead may be grounded and the third lead may act as a signal transmission line. The first lead, the second lead and the third lead of the phase shifter according to embodiments of the present invention can form a suspended waveguide. For such a phase shifter, when a driving voltage is applied to the third lead, the bridging section will be attracted toward the third lead, produce a deformation and contact the third lead. After disconnecting the driving voltage, the bridging section will be reset. Compared with conventional phase shifters, the bridging section of the phase shifter of an embodiment of the present invention can be separated from the third lead faster by gravity after disconnecting the driving voltage applied to the third lead of the phase shifter. This can solve the problem that it is difficult to separate the bridge from the signal line quickly due to the adhesion of the bridge to the signal line during the use of conventional phase shifter. It is also possible to use the combined effect of gravity and elasticity of the bridging section to make the bridging section reset more quickly after disconnecting the driving voltage applied to the third lead, thus effectively reducing the response time.

Furthermore, in the preparation of conventional phase shifters, the bridging section tends to collapse downward, thus making phase shifting impossible. However, in the embodiments of the present invention, even if the bridging section collapses downward, it will be moved by the upward adsorption force toward the third wire after a voltage is applied, and thus it can work normally.

For conventional phase shifters, the height of the bridging section is usually increased to prevent the collapse of the bridging section, but this results in an increase in the driving voltage. For some embodiments of the present invention, a distance between the bridging section and the third lead can be made smaller, thus reducing the driving voltage.

In some embodiments, the phase shifter unit also includes an isolation layer that covers at least a surface of the third lead facing towards the substrate. The isolation layer can serve not only to isolate the third conductive layer, but can also serve to support the third conductive layer.

In some embodiments, the phase shifter may include multiple phase shifter units to achieve a larger phase shift range.

It should be noted that in the embodiments of FIGS. 1A and 1B, the third lead includes a first sub-lead, a second sub-lead disposed on either side of the first sub-lead, and a sidewall connecting the first sub-lead to the second sub-lead. The first sub-lead is on a side of the bridging section away from the substrate, and the second sub-lead is in the same plane as the first and second leads. However, the third lead is not limited to the case shown in the figure. In some other embodiments, the third lead can also be set so that its whole is on the side of the bridging section away from the substrate. In the following, the third lead is illustrated in a manner similar to that in FIG. 1A, instead of being provided as a whole on the side of the bridging section away from the substrate.

Figure 3:
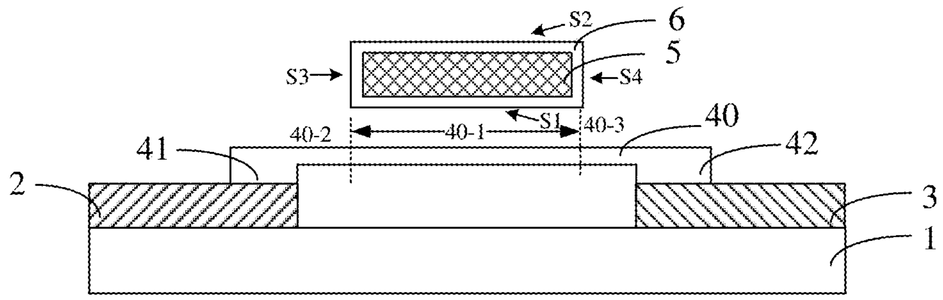
FIG. 3 is a schematic cross-sectional view of the phase shifter according to an embodiment of the present invention.

FIG. 3 shows a schematic view of a cross-section of a phase shifter according to an embodiment of the present invention. As shown in FIG. 2, the phase shifter unit further includes an isolation layer 6 covering a surface S1 of the third lead 5 facing toward the substrate 1 and also covering a surface S2 of the third lead 5 away from the substrate 1 and the side surfaces S3 and S4 between the surface S1 of the third lead 5 away from the substrate and the surface S1 of the third lead 5 facing toward the substrate. This can better ensure that the third lead has sufficient support without deformation.

The material of the isolation layer may be a silicon nitride compound and may, for example, include SiNx. At least one of the first lead, the second lead, and the third lead may include at least one of the following materials: molybdenum-nickel-titanium alloy, copper, and combinations thereof. The bridging section may include at least one of: molybdenum, aluminum, and combinations thereof.

As shown in FIG. 3, the bridging section 4 includes a bridge structure 41 provided opposite to the substrate 1, a first anchoring section 41 connecting the bridge structure 40 to the first lead 2, and a second anchoring section 42 connecting the bridge structure to the second lead 3. The bridge structure 40 includes a middle section 40-1, a first section 40-2 extending from the middle section 401 toward the first anchoring section 41, and a second portion 40-3 extending from the middle portion toward the second anchoring section, wherein a projection of the middle portion 40-1 on the substrate 1 overlaps with a projection of the third lead 5 on the substrate 1.

The inventors found that the stress variation in the bridging section during phase shifting of the phase shifter is mainly concentrated in the middle portion of the bridging section, and therefore the degree of this stress variation can be enhanced by adjusting the shape of the bridging section. In addition, since the type of phase shifter used in the present invention is a capacitive phase shifter, the capacitance size is only positively related to the size of a contact area between the bridging section and the third lead, and is not related to the shape of the bridging section. Therefore, the inventors have proposed some further embodiments.

For example, the width of the middle portion can be set to satisfy at least one of the following: the width of the middle portion is greater than the width of the first portion, and the width of the middle portion is greater than the width of the second portion.

Figure 4A:
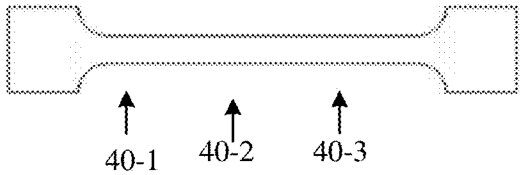
FIG. 4A is a schematic top view of a bridging section according to an embodiment of the present invention.
Figure 4B:
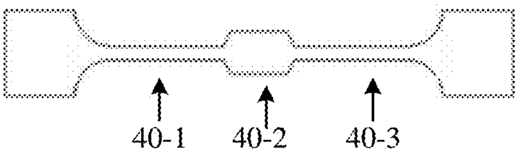
FIG. 4B is a schematic top view of a bridging section according to an embodiment of the present invention.
Figure 5A:
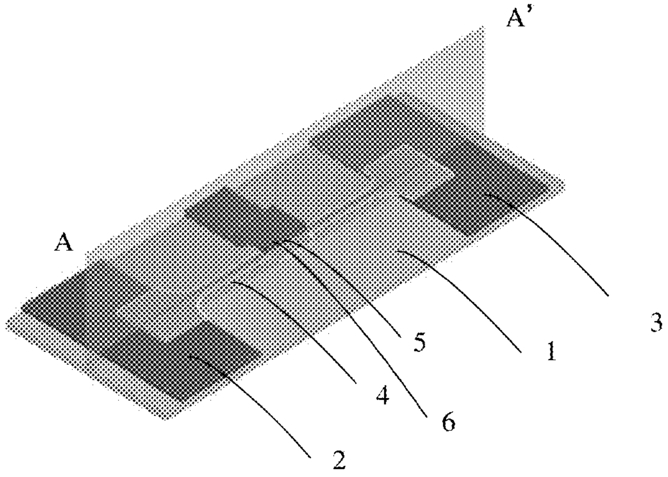
FIG. 5A is a conceptual view of a phase shifter employing the bridging section of FIG. 4B, according to an embodiment of the present invention.
Figure 5B:
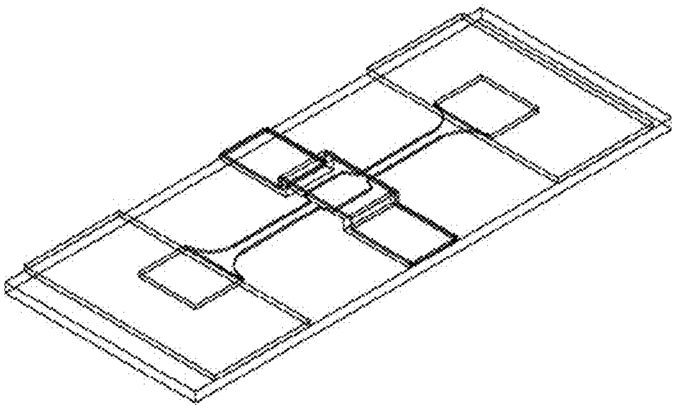
FIG. 5B shows a perspective schematic view of a phase shifter employing the bridging section of FIG. 4B according to an embodiment of the present invention.

FIGS. 4A and 4B show schematic top view of a bridging section according to an embodiment of the present invention. FIG. 5A shows a conceptual view of a phase shifter employing the bridging section of FIG. 4B according to an embodiment of the present invention, and FIG. 5B shows a perspective schematic view of a phase shifter employing the bridging section of FIG. 4B according to an embodiment of the present invention.

Compared with FIG. 4A, in the embodiment of FIG. 4B, the middle portion 40-1 is set such that its width is greater than the width of the first portion 40-1 and also greater than the width of the second portion 40-2. In this way, the first and second portions next to the middle portion of the bridging section are narrowed, i.e., the bridging section is limited to a spindle shape with two narrow ends and a wide middle portion, making it easier for the bridging section to undergo a deformation displacement and thus improving the on/off response speed of the phase shifter unit.

The spindle shape of the bridging section is not limited to the specific shape in FIG. 4B, but can also be other shapes with narrow ends and wide middle portion. For example, it is also possible to set one of the first portion and the second portion to a narrow shape with respect to the middle portion. The first portion and the second portion of the bridging part are also not set too narrow that they appear to curl. The improvement of this embodiment enables the phase shifter unit of the present invention to be more easily driven by a current to shift the phase, thereby reducing the driving voltage and response time.

Figure 6:
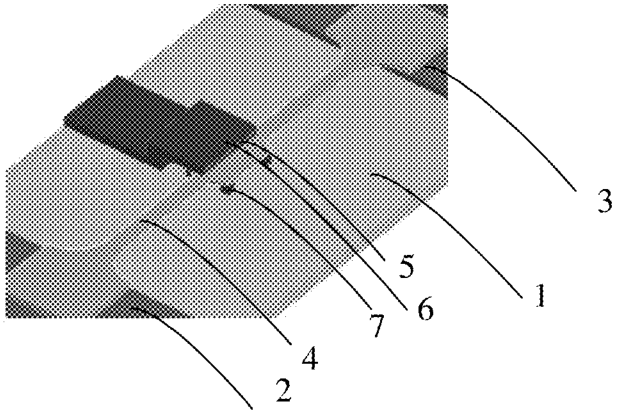
FIG. 6 is a schematic view of a phase shifter according to an embodiment of the present invention.
Figure 7:
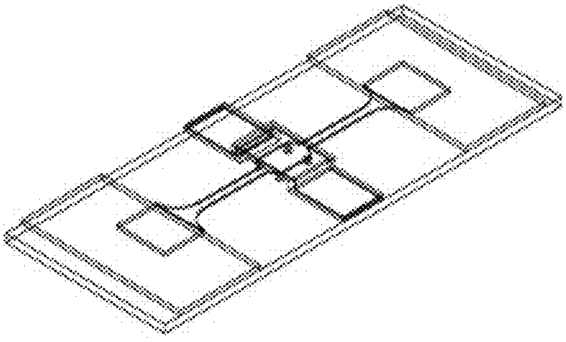
FIG. 7 shows a perspective view of the phase shifter of FIG. 6.
Figure 8:
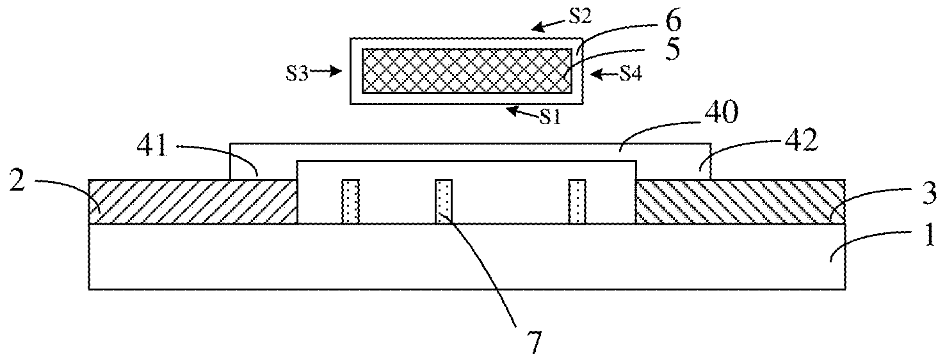
FIG. 8 is a schematic cross-sectional view of the phase shifter of FIG. 7.

FIG. 6 shows a schematic view of a phase shifter according to an embodiment of the present invention. FIG. 7 shows a perspective view of the phase shifter of FIG. 6. FIG. 8 shows a schematic cross-sectional view of the phase shifter of FIG. 7. As shown in FIGS. 6-8, in some embodiments of the present invention, the phase shifter unit 800 may further include a support 7 which is provided on a surface of the substrate 1 provided with the first lead 2 and the second lead 3, and a projection of the support 7 on the substrate 1 overlaps with a projection of the bridge structure 40 on the substrate 1. This can provide support to the bridging section to prevent the bridging section from collapsing. In order to ensure that the support is sufficiently hard so as not to deform, the support can include a silicon nitride compound. For example, the support may include SiNx.

Figure 9:
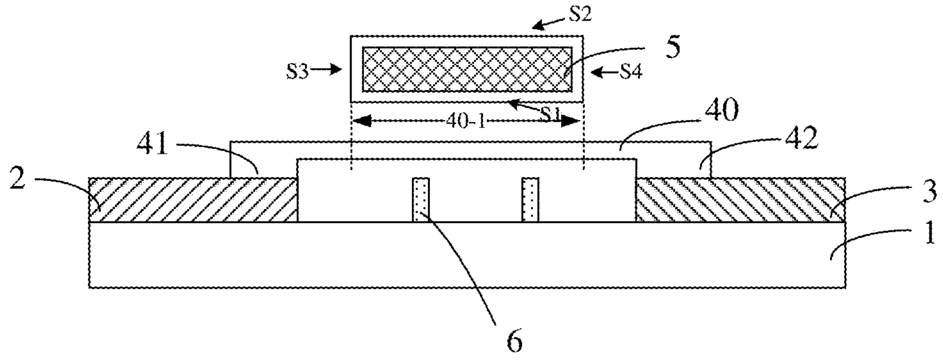
FIG. 9 is a schematic cross-sectional view of a phase shifter according to an embodiment of the present invention.

FIG. 9 shows a cross-sectional schematic view of a phase shifter according to an embodiment of the present invention. As shown in FIG. 9, the support 6 can be set so that its projection on the substrate falls within the projection of the middle portion of the bridging section on the substrate. In this way, the support can provide support to the area of the bridging section where the stress variation is most significant (i.e., the middle section) and can better prevent the bridging section from collapsing. The collapse of the bridging section generally occurs during the process of releasing the sacrificial layer of the fabrication process or during the operation of the phase shifter due to excessive displacement of the bridging section resulting in damage to the bridging section that cannot be reset. The solution of an embodiment of the present invention could prevent the collapse of the bridging section.

Figure 10:
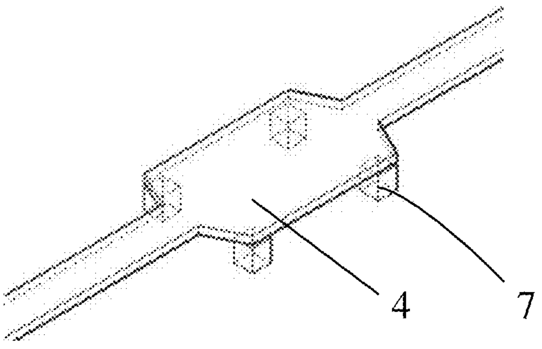
FIG. 10 is a partial schematic view of a phase shifter according to an embodiment of the present invention.

FIG. 10 shows a partial schematic view of a phase shifter according to an embodiment of the present invention. In some embodiments, the support may include at least two sub-supports and the at least two sub-supports are located on different sides of the middle portion of the bridging section in an extension direction of the bridging section. As shown in FIG. 10, the support may include four sub-supports and the four sub-supports correspond to the four corners of the middle portion of the bridging section one by one. This could better prevent the collapse of the bridging section.

Figure 11:
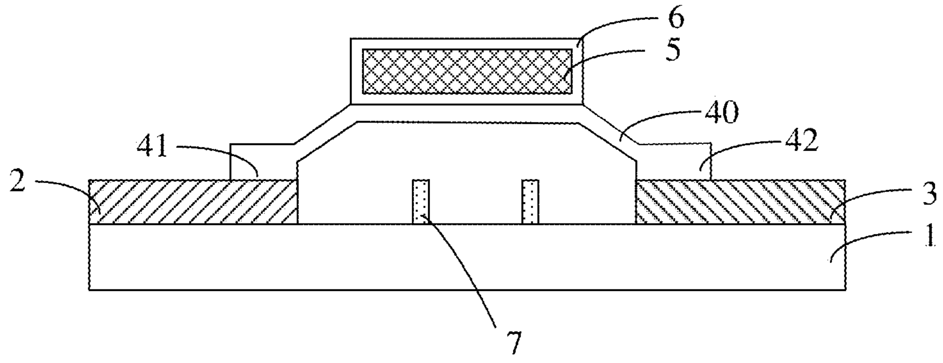
FIG. 11 is a schematic cross-sectional view of the phase shifter according to an embodiment of the present invention with a driving voltage in an on state.

FIG. 11 shows a cross-sectional schematic view when the driving voltage of the phase shifter is in the on state according to an embodiment of the present invention. As shown in FIG. 11, when the driving voltage applied to the third lead 5 is on, the bridging section is attracted to toward the third lead and deformation occurs. When the driving voltage is off, referring to FIG. 9, the bridging section does not collapse easily due to the presence of the support.

Figure 12:
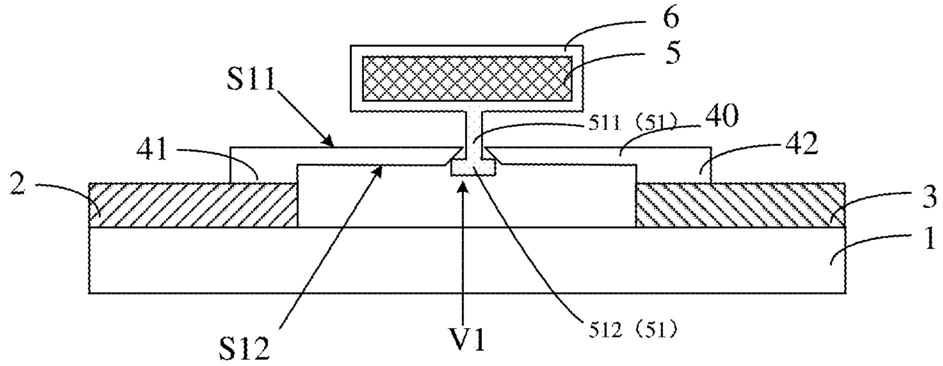
FIG. 12 is a schematic cross-sectional view of a phase shifter according to an embodiment of the present invention.

FIG. 12 shows a cross-sectional schematic view of a phase shifter according to an embodiment of the present invention. As shown in FIG. 12, the middle portion 40 of the bridging section has a through-hole V1, and the isolation layer further includes a first extension 51 extending from the surface of the third lead 5 toward the substrate 1, the first extension 51 has a first subpart 511 passing through the through-hole V1 and a second subpart 512 opposite to the substrate surface 1, the second subpart 512 is connected to an end of the first subpart facing toward the substrate 1, and wherein a size of the projection of the second subpart 512 on the substrate 1 is larger than a size of the projection of the through-hole V1 on the substrate 1. Such an "inverted T-shaped" structure also better prevents collapse of the bridging section.

Figure 13:
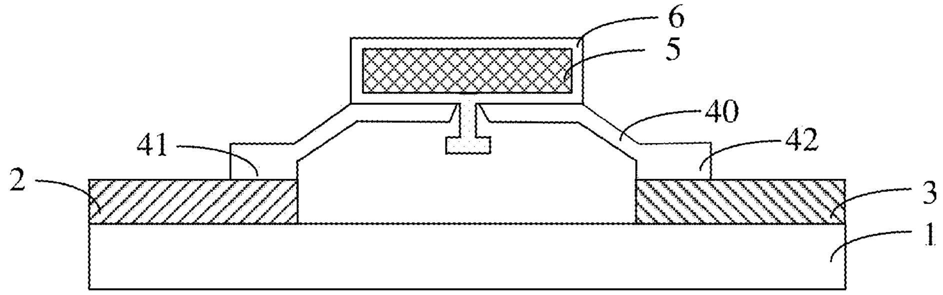
FIG. 13 shows a schematic cross-sectional view of the phase shifter of FIG. 12 in the on state of the driving voltage.

FIG. 13 shows a cross-sectional view of the phase shifter of FIG. 12 when the driving voltage is in a on state. As shown in FIG. 13, when the driving voltage applied to the third lead 5 is on, the bridging section is attracted towards the third lead and deformation occurs. When the driving voltage is off, as can be seen with reference to FIG. 12, the bridging section is not easily collapsed due to the presence of the first extension of the isolation layer.

As shown in FIGS. 12-13, an extension direction of the second subpart 512 may be perpendicular to extension direction of the first subpart 511. The distance from the second subpart 512 to the substrate 1 may be less than or equal to the distance from the bridging section to the substrate to better achieve the effect of preventing the bridging section from collapsing.

Figure 14:
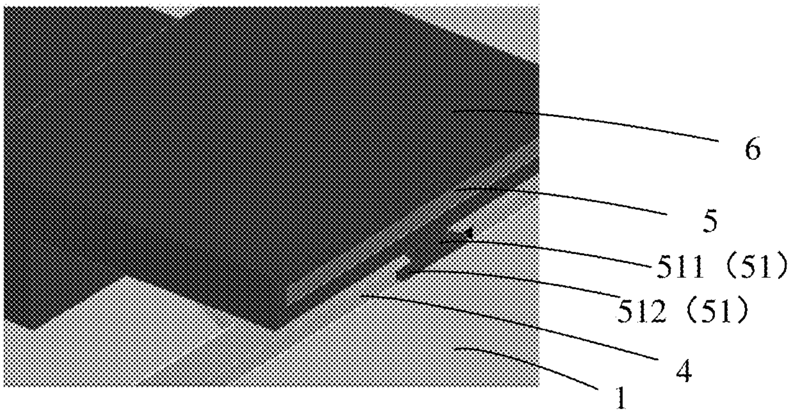
FIG. 14 is a schematic view of a partial cross-section of the bridging section of the phase shifter of FIG. 12.
Figure 15:
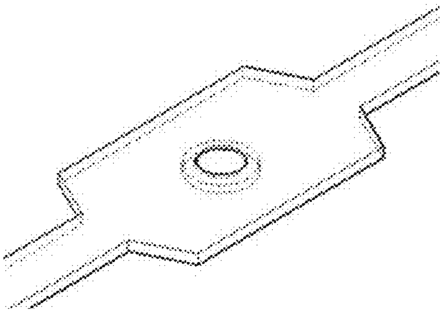
FIG. 15 shows a perspective schematic view of the bridging section of the phase shifter of FIG. 12.

FIG. 14 shows a schematic view of a partial cross section of the bridging section of the phase shifter of FIG. 12 (e.g., along the BB' cross section in FIG. 1A). FIG. 15 shows a perspective schematic view of the bridging section of the phase shifter of FIG. 12. As shown in FIGS. 12, 13 and 15, the bridge structure has a first surface S11 away from the substrate (see FIG. 12) and a second surface S12 facing toward the substrate, wherein the area of the through-hole in the first surface S11 is smaller than the area of the through-hole in the second surface S11.

Figure 16:
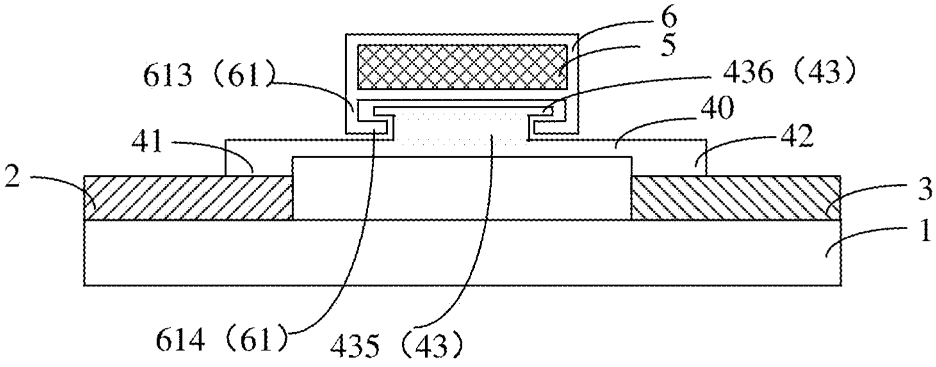
FIG. 16 is a schematic cross-sectional view of a phase shifter according to an embodiment of the present invention.

FIG. 16 shows a schematic cross-sectional view of a phase shifter according to an embodiment of the present invention. As shown in FIG. 16, the isolation layer 6 has a second extension 61, a third subpart 613 of the second extension 61 extending from a side surface of the third lead 5 toward the substrate 1, and a fourth subpart 614 of the second extension 61 extending from an end of the third subpart 613 near the substrate 1 toward a middle portion 40 of the bridging section. The bridging section has a third extension 43, a fifth subpart 435 of the third extension 43 extending from a side of the middle portion 40 of the bridging section away from the substrate 1 toward the third lead 5, and a sixth subpart 436 of the third extension 43 extending from a side of the fifth subpart facing toward the third lead toward the third subpart 613. The projection of the fourth subpart on the substrate overlaps with the projection of the sixth subpart on the substrate.

Figure 17:
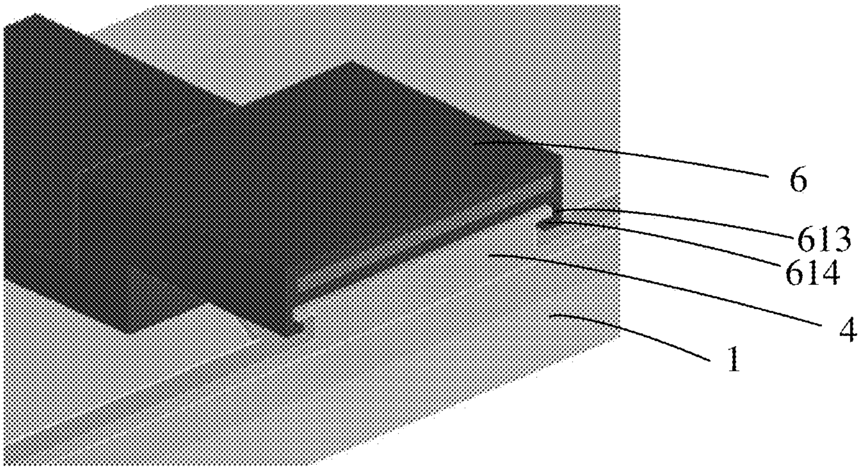
FIG. 17 is a schematic view of a partial cross-section of the bridging section of the phase shifter of FIG. 16.
Figure 18:
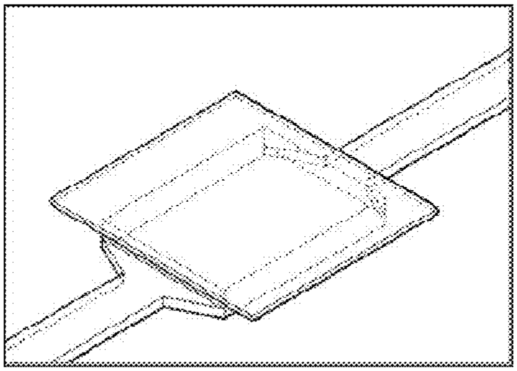
FIG. 18 shows a perspective schematic view of the bridging section of the phase shifter of FIG. 16.

FIG. 17 shows a schematic view of a partial cross section of the bridging portion of the phase shifter of FIG. 16 (e.g., along the BB' cross section in FIG. 1A). FIG. 18 shows a perspective schematic view of the bridging section of the phase shifter of FIG. 16. As shown in FIGS. 16-18, the middle portion of the bridging section is thickened compared to the previous embodiments, so that the bridging section is more likely to receive the effect of gravity and contact the third lead causing an adhesion to the third lead when the driving voltage is off.

Figure 19:
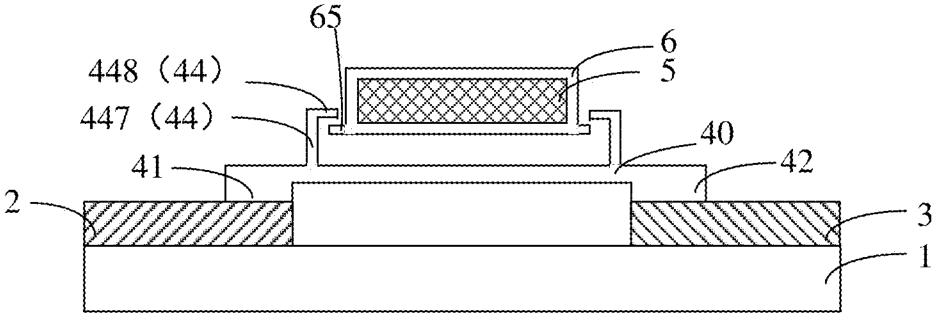
FIG. 19 is a schematic view of a cross-section of a phase shifter according to an embodiment of the present invention.

FIG. 19 shows a schematic cross-section of a phase shifter according to an embodiment of the present invention. As shown in FIG. 19, the bridging section has a fourth extension 44, a seventh subpart 447 of the fourth extension 44 extends from a surface of the bridging section away from the substrate 1 and in a direction away from the substrate. An eighth subpart 448 of the fourth extension 44 extends from an end of the seventh subpart 447 away from the substrate 1 and toward the third lead 5. The isolation layer 6 has a fifth extension 65 that extends from a side of the third lead 5 facing toward the substrate 1 and toward the seventh subpart. Therein, the projection of the fifth extension 65 on the substrate 1 overlaps with the projection of the eighth subpart 448 on the substrate.

Figure 20:
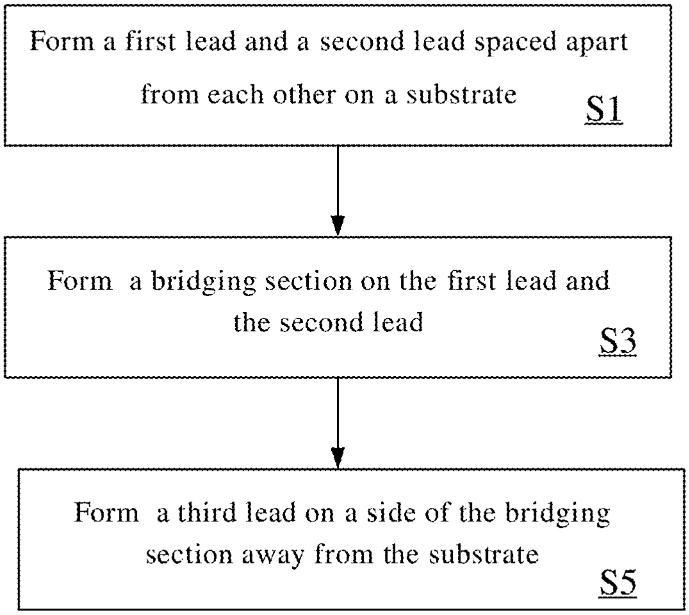
FIG. 20 is a schematic flow chart of a method for preparing a phase shifter according to an embodiment of the present invention.

FIG. 20 shows a flow chart of a method for preparing a phase shifter according to an embodiment of the present invention. As shown in FIG. 20, the method for preparing a phase shifter according to an embodiment of the present invention may include:

S1. forming a first lead and a second lead spaced apart from each other on a substrate;

S3. forming a bridging section on the first lead and the second lead, wherein the bridging section connects the first lead and the second lead;

S5. forming a third lead on a side of the bridging section away from the substrate.

In some embodiments, the method for preparing a phase shifter according to embodiments of the present invention further includes forming an isolation layer covering at least a surface of the third lead facing towards the substrate of the substrate.

Figure 21:
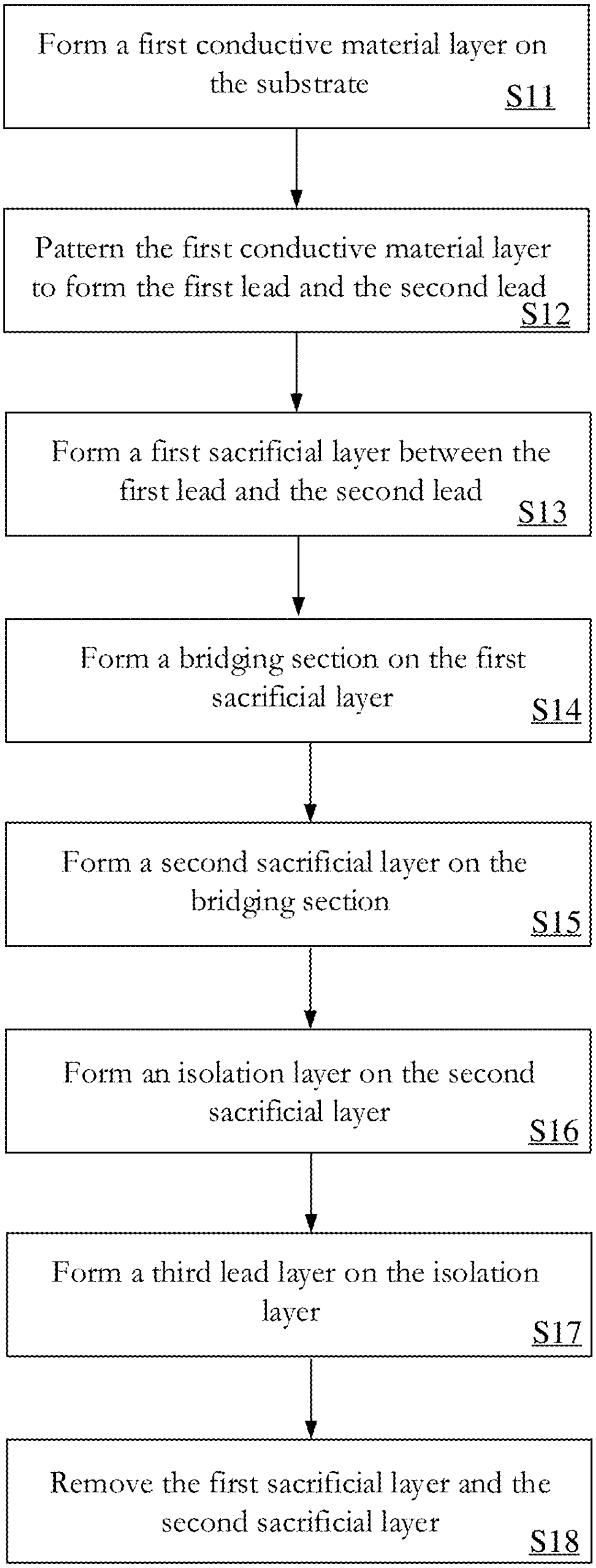
FIG. 21 is a schematic flow chart of a method for preparing a phase shifter according to embodiments of the present invention.

FIG. 21 is a schematic flow chart of a method for preparing a phase shifter according to embodiments of the present invention. The method of FIG. 21 allows preparation of a phase shifter as illustrated in FIGS. 1-FIG. 5B. As shown in FIG. 21, forming the first lead, the second lead, the bridging section, the third lead, and the isolation layer includes:

S11. forming a first conductive material layer on the substrate;

S12. patterning the first conductive material layer to form the first lead and the second lead;

S13. forming a first sacrificial layer between the first lead and the second lead;

S14. forming a bridging section on the first sacrificial layer;

S15. forming a second sacrificial layer on the bridging section;

S16. forming an isolation layer on the second sacrificial layer;

S17. forming a third lead layer on the isolation layer;

S18. removing the first sacrificial layer and the second sacrificial layer.

In some embodiments, the bridging section may include a bridge structure disposed opposite the substrate, a first anchoring section connecting the bridge structure to the first lead, and a second anchoring section connecting the bridge structure to the second lead, wherein the bridge structure includes a middle portion, a first portion extending from the middle portion and toward the first anchoring section, and a second portion extending from the middle portion and toward the second anchoring section. Wherein the projection of the middle portion on the substrate overlaps with the projection of the third lead on the substrate, the middle portion has a width satisfying at least one of: the width of the middle portion is greater than a width of the first portion, and a width of the middle portion is greater than a width of the second portion. The method for preparing a phase shifter according to an embodiment of the present invention may further include:

S7. forming, before forming the first sacrificial layer, a support between the first lead and the second lead, wherein a projection of the support on the substrate falls within a projection of the middle portion of the bridging section on the substrate.

Figure 22:
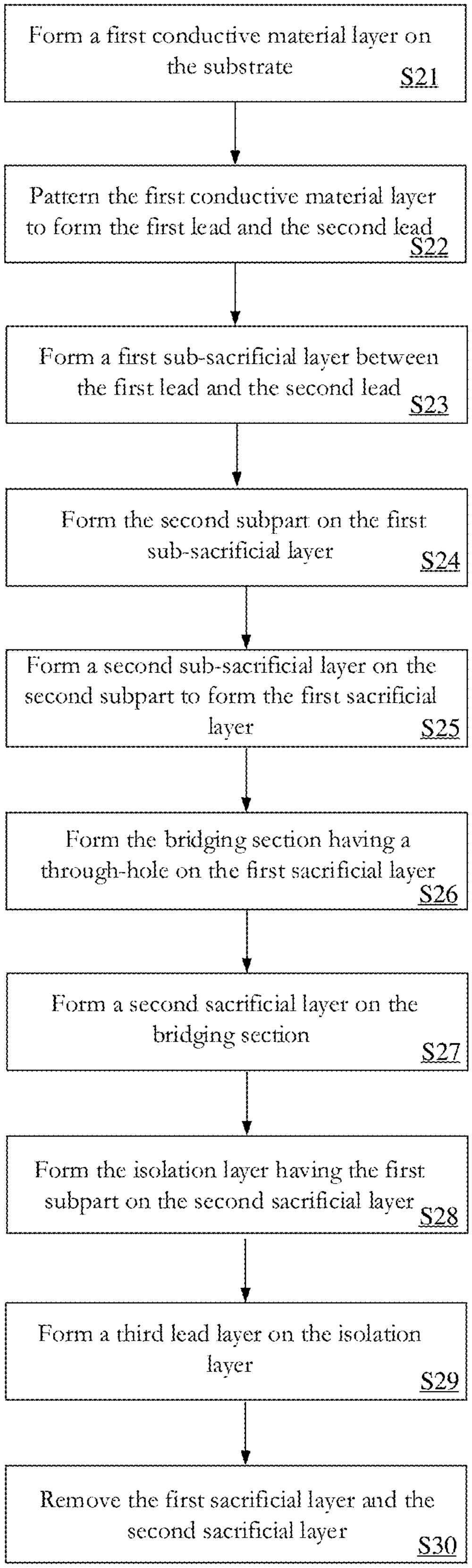
FIG. 22 is a schematic flow chart of a method for preparing a phase shifter according to embodiments of the present invention.

FIG. 22 shows a schematic flow chart of a method for preparing a phase shifter according to an embodiment of the present invention. The method of FIG. 22 allows the preparation of a phase shifter as illustrated in FIGS. 12-FIG. 15. As shown in FIG. 21, in an embodiment of the present invention, forming the first lead, the second lead, the bridging section, the third lead, and the isolation layer may include:

S21. forming a first conductive material layer on the substrate;

S22. patterning the first conductive material layer to form the first lead and the second lead;

S23. forming a first sub-sacrificial layer between the first lead and the second lead;

S24. forming the second subpart on the first sub-sacrificial layer;

S25. forming a second sub-sacrificial layer on the second subpart to form the first sacrificial layer;

S26. forming the bridging section having a through-hole on the first sacrificial layer;

S27. forming a second sacrificial layer on the bridging section;

S28. forming the isolation layer having the first subpart on the second sacrificial layer;

S29. forming a third lead layer on the isolation layer;

S30. removing the first sacrificial layer and the second sacrificial layer.

Figure 23:
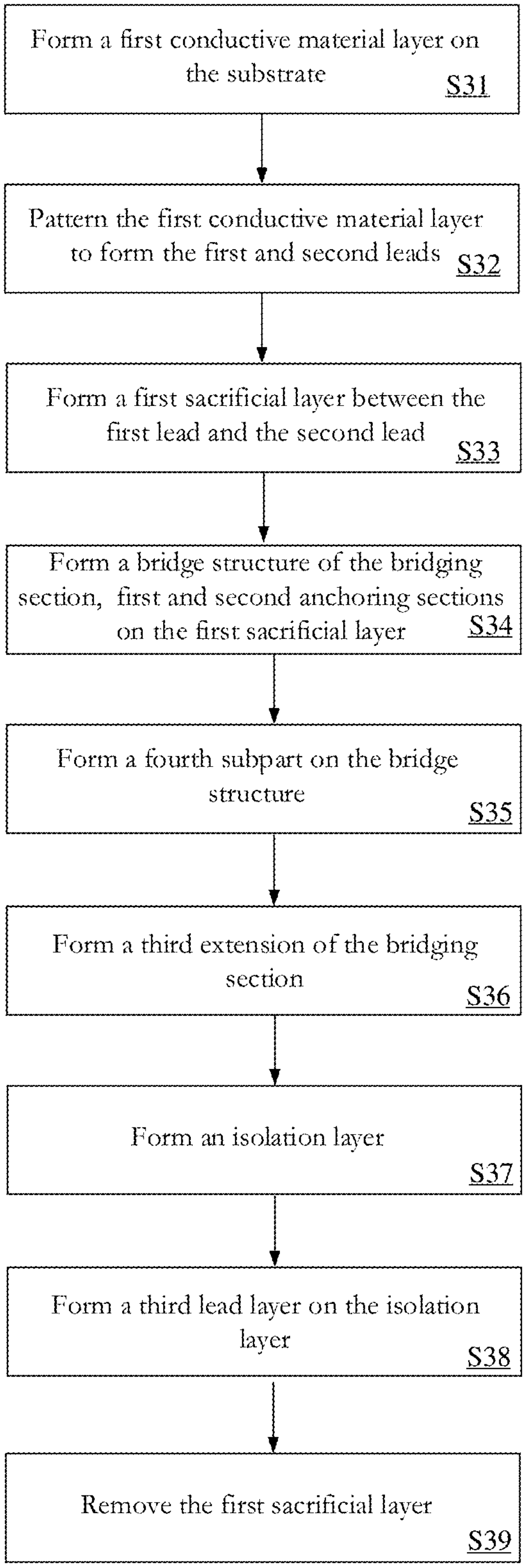
FIG. 23 is a schematic flow chart of a method for preparing a phase shifter according to embodiments of the present invention.

FIG. 23 shows a schematic flow chart of a method for preparing a phase shifter according to an embodiment of the present invention. The method of FIG. 23 allows the preparation of a phase shifter as illustrated in FIGS. 16-FIG. 18. As shown in FIG. 23, in an embodiment of the present invention, forming the first lead, the second lead, the bridging section, the third lead, and the isolation layer may include:

S31. forming a first conductive material layer on the substrate;

S32. patterning the first conductive material layer to form the first lead and the second lead;

S33. forming a first sacrificial layer between the first lead and the second lead;

S34. forming, on the first sacrificial layer, a bridge structure of the bridging section disposed opposite the substrate, a first anchoring section connecting the bridge structure to the first lead and a second anchoring section connecting the bridge structure to the second lead;

S35. forming a fourth subpart on the bridge structure;

S36. forming a third extension of the bridging section;

S37. forming an isolation layer;

S38. forming a third lead layer on the isolation layer;

S39. removing the first sacrificial layer.

Figure 24:
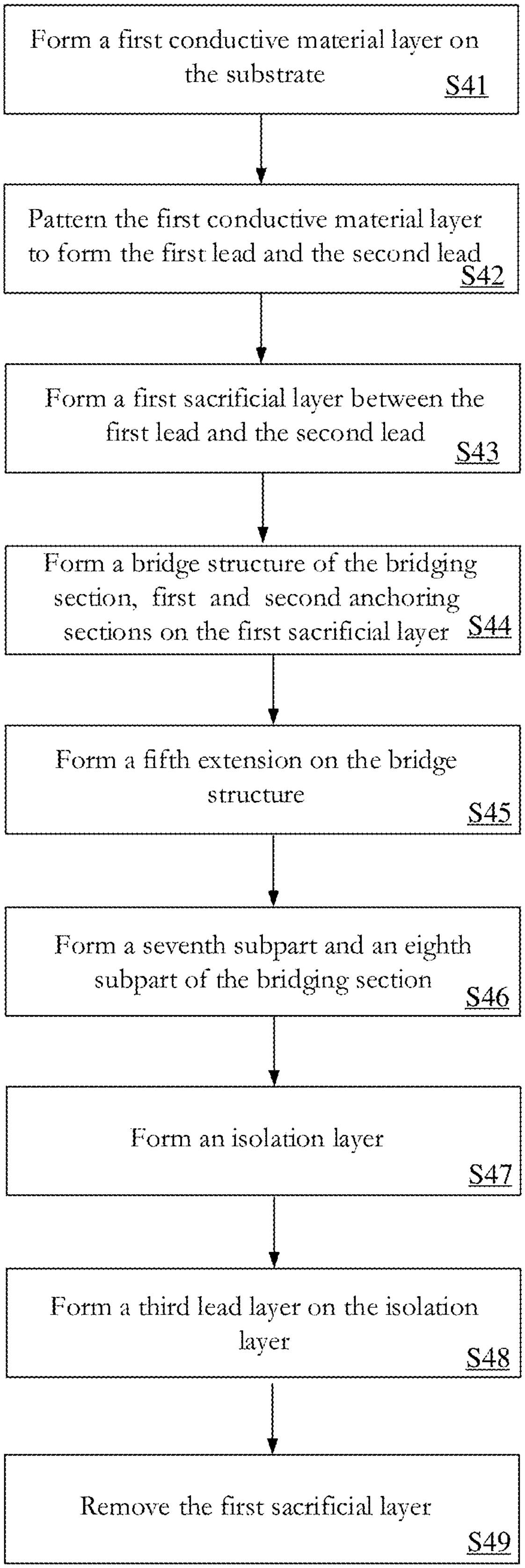
FIG. 24 is a schematic flow chart of the method for preparing a phase shifter according to embodiments of the present invention.

FIG. 24 shows a schematic flow chart of a method for preparing a phase shifter according to an embodiment of the present invention. The method of FIG. 24 allows the preparation of a phase shifter as illustrated in FIG. 19. As shown in FIG. 23, in an embodiment of the present invention, forming the first lead, the second lead, the bridging section, the third lead, and the isolation layer may include:

S41. forming a first conductive material layer on the substrate;

S42. patterning the first conductive material layer to form the first lead and the second lead;

S43. forming a first sacrificial layer between the first lead and the second lead;

S44. forming, on the first sacrificial layer, a bridge structure of the bridging section disposed opposite the substrate, a first anchoring section connecting the bridge structure to the first lead and a second anchoring section connecting the bridge structure to the second lead;

S45. forming a fifth extension on the bridge structure;

S46. forming a seventh subpart and an eighth subpart of the bridging section;

S47. forming an isolation layer;

S48. forming a third lead layer on the isolation layer; and

S49. removing the first sacrificial layer.

The specific embodiments have been described, and are not intended to limit the scope of the disclosure. In fact, the novel embodiments described herein can be implemented in a variety of other forms. In addition, various omissions, substitutions, and changes in the form of the embodiments described herein may be made without departing from the spirit of the disclosure. The following claims and their equivalents are intended to cover such forms or modifications that fall within the scope and spirit of the disclosure.

What is claimed is:

1. A phase shifter comprising at least one phase shifter unit, wherein the phase shifter unit comprises:

a substrate;

a first lead and a second lead on the substrate and spaced apart from each other;

a bridging section on the first lead and the second lead, wherein the bridging section is connected to the first lead and the second lead; and a third lead on a side of the bridging section away from the substrate, wherein the phase shifter unit further comprises an isolation layer which covers at least a surface of the third lead facing towards the substrate, wherein the bridging section comprises a bridge structure disposed opposite to the substrate, a first anchoring section connecting the bridge structure to the first lead and a second anchoring section connecting the bridge structure to the second lead, wherein the bridge structure comprises a middle portion, a first portion extending from the middle portion toward the first anchoring section and a second portion extending from the middle portion toward the second anchoring section, and wherein a projection of the middle portion on the substrate overlaps with a projection of the third lead on the substrate, wherein a width of the middle portion satisfies at least one of the following: the width of the middle portion is greater than a width of the first portion, and the width of the middle portion is greater than a width of the second portion, wherein the phase shifter unit further comprises: a support on a surface of the substrate provided with the first lead and the second lead, and wherein a projection of the support on the substrate overlaps with a projection of the bridge structure on the substrate, wherein the support comprises at least two sub-supports, and wherein the at least two sub-supports are on different sides of the middle portion of the bridging section in an extension direction of the bridging section.

2. The phase shifter according to claim 1, wherein the isolation layer further covers a surface of the third lead away from the substrate and a side surface of the third lead between a surface of the third lead away from the substrate and a surface of the third lead facing toward the substrate.

3. The phase shifter according to claim 1, wherein the projection of the support on the substrate falls within the projection of the middle portion of the bridging section on the substrate.

4. The phase shifter according to claim 1, wherein the support comprises four sub-supports, and wherein the four sub-supports correspond to four corners of the middle portion of the bridging section one by one.

5. The phase shifter according to claim 1, wherein the middle portion of the bridging section has a through-hole, the isolation layer further comprises a first extension extending, from a surface of the third lead facing toward the substrate, wherein the first extension has a first subpart passing through the through-hole and a second subpart opposite the substrate surface, wherein the second subpart is connected to an end of the first subpart facing toward the substrate, and wherein a size of a projection of the second subpart on the substrate is larger than a size of a projection of the through-hole on the substrate.

6. The phase shifter according to claim 5, wherein an extension direction of the second subpart is perpendicular to an extension direction of the first subpart.

7. The phase shifter according to claim 6, wherein a distance of the second subpart to the substrate is less than or equal to a distance of the bridging section to the substrate.

8. The phase shifter according to claim 7, wherein the bridge structure has a first surface away from the substrate and a second surface facing toward the substrate, and wherein an area of the through-hole at the first surface is less than an area of the through-hole at the second surface.

9. The phase shifter according to claim 8, wherein the isolation layer comprises a second extension, wherein a third subpart of the second extension extending, from a side surface of the third lead, towards the substrate, and wherein a fourth subpart of the second extension extending, from an end of the third subpart near the substrate, towards the middle portion of the bridging section;

wherein the bridging section further comprises a third extension, wherein a fifth subpart of the third extension extending, from a side of the middle portion of the bridging section away from the substrate, toward the third lead, wherein a sixth subpart of the third extension extending, from a side of the fifth subpart facing toward the third lead, toward the third subpart, and wherein a projection of the fourth subpart on the substrate overlaps with a projection of the sixth subpart on the substrate.

10. The phase shifter according to claim 9, wherein the bridging section comprises a fourth extension, wherein a seventh subpart of the fourth extension extends from a surface of the bridging section away from the substrate and in a direction away from the substrate, wherein an eighth subpart of the fourth extension extends from an end of the seventh subpart away from the substrate and towards the third lead;

the isolation layer comprises a fifth extension, wherein the fifth extension extends, from a side of the third lead facing toward the substrate, toward the seventh subpart, wherein a projection of the fifth extension on the substrate overlaps with a projection of the eighth subpart on the substrate.

11. The phase shifter according to claim 1, wherein the third lead comprises a first sub-lead, a second sub-lead disposed on both sides of the first sub-lead, a sidewall connecting the first sub-lead to the second sub-lead, the first sub-lead being on a side of the bridging section away from the substrate, the second sub-lead being in the same plane as the first lead.

12. The phase shifter according to claim 1, wherein the third lead is integrally on a side of the bridging section away from the substrate.

13. The phase shifter according to claim 1, wherein the isolation layer comprises a silicon nitride compound;

at least one of the first lead, the second lead and the third lead comprises at least one of: a molybdenum-nickel-titanium alloy, copper and combinations thereof;

the bridging section comprises at least one of: molybdenum, aluminum and combinations thereof.

14. A method for preparing a phase shifter, comprising forming at least one phase shifter unit, wherein forming the at least one phase shifter unit comprises:

forming a first lead and a second lead spaced apart from each other on a substrate;

forming a bridging section on the first lead and the second lead, wherein the bridging section connects the first lead and the second lead;

forming a third lead on a side of the bridging section away from the substrate;

forming an isolation layer covering at least a surface of the third lead facing towards the substrate, wherein the bridging section comprises a bridge structure disposed opposite to the substrate, a first anchoring section connecting the bridge structure to the first lead and a second anchoring section connecting the bridge structure to the second lead, the bridge structure comprising a middle portion, a first portion extending from the middle portion to the first anchoring section, and a second portion extending from the middle portion to the second anchoring section, wherein a projection of the middle portion on the substrate overlaps with a projection of the third lead on the substrate, wherein the middle portion having a width satisfying at least one of the following: the width of the middle portion is greater than a width of the first portion, and the width of the middle portion is greater than a width of the second portion; and forming, before forming a first sacrificial layer, a support between the first lead and the second lead, wherein a projection of the support on the substrate overlaps with a projection of the bridge structure on the substrate, wherein the support comprises at least two sub-supports, and wherein the at least two sub-supports are on different sides of the middle portion of the bridging section in an extension direction of the bridging section.

* * * * *